(12) United States Patent
Barbolini et al.

(10) Patent No.: US 9,625,077 B2
(45) Date of Patent: Apr. 18, 2017

(54) FLUID LINE ASSEMBLY

(71) Applicant: Röchling Automotive SE & Co. KG, Mannheim (DE)

(72) Inventors: Marco Barbolini, Bolzano (IT); Dieter Kerschbaumer, Tramin (IT); Christian Platzgummer, Lana (IT)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 0 days.

(21) Appl. No.: 15/012,169

(22) Filed: Feb. 1, 2016

(65) Prior Publication Data
US 2016/0238175 A1 Aug. 18, 2016

(30) Foreign Application Priority Data

Feb. 17, 2015 (DE) ......................... 10 2015 202 851

(51) Int. Cl.
| | | |
|---|---|---|
| F02M 35/00 | (2006.01) | |
| F16L 55/052 | (2006.01) | |
| F16L 55/033 | (2006.01) | |
| F02M 35/12 | (2006.01) | |

(52) U.S. Cl.
CPC ....... F16L 55/052 (2013.01); F02M 35/1266 (2013.01); F16L 55/033 (2013.01)

(58) Field of Classification Search
CPC .................................................. F16L 155/02
USPC ........................................................ 181/229
See application file for complete search history.

(56) References Cited

U.S. PATENT DOCUMENTS

| | | | | |
|---|---|---|---|---|
| 6,715,580 B1 * | 4/2004 | Gerstner | ............... | F16L 55/033 181/224 |
| 6,983,820 B2 * | 1/2006 | Boast | ...................... | F01N 1/003 181/232 |
| 7,249,652 B2 * | 7/2007 | Wolf | ................. | F02M 35/10137 123/184.57 |

(Continued)

FOREIGN PATENT DOCUMENTS

| | | |
|---|---|---|
| DE | 10 2006 038 830 A1 | 2/2008 |
| DE | 10 2010 046 759 A1 | 4/2011 |

(Continued)

OTHER PUBLICATIONS

Espacenet Bibliographic data: DE102006038830, Published Feb. 21, 2008, 1 pg.

(Continued)

*Primary Examiner* — Forrest M Phillips
(74) *Attorney, Agent, or Firm* — Rankin, Hill & Clark LLP

(57) ABSTRACT

A fluid line assembly, preferably for charge air to be supplied to an internal combustion engine, comprising a fluid conduit extending along a longitudinal axis which defines an axial direction for the passage of a fluid and comprising a sound attenuation assembly received in an axial receiving portion of the fluid conduit which comprises at least two piping components, said sound attenuation assembly at least contributing to an attenuation of sound propagated in the fluid. The invention provides that the connection of the at least two piping components of the axial receiving portion with one another, and the connection of the sound attenuation assembly with the axial receiving portion of the fluid conduit is free of adhesive and melted connections.

24 Claims, 3 Drawing Sheets

(56) References Cited

U.S. PATENT DOCUMENTS

| | | | | |
|---|---|---|---|---|
| 7,631,726 B2* | 12/2009 | McWilliam | ........ | F02M 35/1211 |
| | | | | 181/206 |
| 7,802,651 B2* | 9/2010 | Park | ........ | B01D 46/10 |
| | | | | 181/224 |
| 7,934,581 B2* | 5/2011 | Kim | ........ | F04D 29/665 |
| | | | | 123/184.53 |
| 8,327,975 B2* | 12/2012 | Ortman | ........ | F02B 33/44 |
| | | | | 123/184.53 |
| 8,408,357 B2* | 4/2013 | Cheung | ........ | F02M 35/1216 |
| | | | | 123/184.53 |
| 9,057,313 B2* | 6/2015 | Heeb | ........ | F01N 13/00 |
| 2004/0238273 A1* | 12/2004 | Fritskey | ........ | F01N 1/12 |
| | | | | 181/264 |
| 2007/0074930 A1* | 4/2007 | Tomerlin | ........ | B64D 13/00 |
| | | | | 181/252 |
| 2010/0193282 A1* | 8/2010 | Kim | ........ | F04D 29/665 |
| | | | | 181/229 |

FOREIGN PATENT DOCUMENTS

| | | |
|---|---|---|
| DE | 10 2010 020 064 A1 | 11/2011 |
| DE | 10 2011 120 148 A1 | 6/2013 |

OTHER PUBLICATIONS

Espacenet Bibliographic data:DE102010020064, Published Nov. 17, 2011, 1 pg.

German Search Report for corresponding DE 10 2015 202 851.8 mailed Oct. 26, 2015, 11 pgs.

\* cited by examiner

FLUID LINE ASSEMBLY

The present invention relates to a fluid line assembly, preferably for charge air to be supplied to an internal combustion engine, comprising a fluid conduit extending along a longitudinal axis which defines an axial direction for the passage of a fluid and comprising a sound attenuation assembly received in an axial receiving portion of the fluid conduit which comprises at least two piping components, said sound attenuation assembly at least contributing to an attenuation of sound propagated in the fluid. In the following description, a radial direction and a circumferential direction relate to the previously defined axial direction and define therewith a cylindrical coordinate system.

BACKGROUND OF THE INVENTION

Such a fluid line assembly is known from the publication DE 10 2011 000 920 A1. This is used to supply charge air to an internal combustion engine. The sound attenuation assembly is received in a receiving portion of a fluid conduit, wherein the receiving portion is formed through flared end regions of two fluid conduit portions as the above-mentioned piping components. In order to enable the introduction during installation of the fluid line assembly of the sound attenuation assembly into the receiving portion, which in the installed state is generally completely enclosed, the receiving portion is formed from at least two piping components.

The two fluid conduit portions are melted together in the receiving portion. During melting, however, the risk exists that melting residue may pass into the fluid conduit, be carried along by the charge air to be supplied during operation of the internal combustion engine and enter into the internal combustion engine, where it may lead in certain cases to operational disruptions. Similar problems could occur if the two fluid pipeline sections were joined together by gluing.

SUMMARY OF THE INVENTION

It is therefore an object of the present invention to provide a fluid line assembly in which the probability of an intrusion of foreign matter into the fluid conduit during attachment of the sound attenuation assembly to the fluid conduit is reduced in comparison with the prior art.

According to a first aspect of the present invention, this object is achieved by a fluid line assembly of the aforementioned type in which the connection of the at least two piping components of the axial receiving portion with one another as well as the connection of the sound attenuation assembly with the axial receiving portion of the fluid conduit is free of adhesive and melt connections.

In this application, an adhesive connection is characterized as a connection between two components which is based on an adhesive force by means of adhesive. By a melt connection is meant a material-locking connection wherein the components to be connected are temporarily locally softened or even liquefied, and the thusly flowably-rendered materials are mixed with one another.

Although it is generally preferred that the entire receiving portion with the sound attenuation assembly received therein is free of adhesive and melt connections, it is sufficient to achieve the advantages according to the invention if the at least two piping components of the receiving portion, which receives the sound attenuation assembly, are connected with one another free from adhesive and melt connections and if the sound attenuation assembly is connected with the receiving portion without adhesion and melting. It should not therefore be excluded that at least one other component, which does not belong to the sound attenuation assembly and which is not a piping component of the fluid line assembly contributing to the receiving portion, is connected with the receiving portion and/or the sound attenuation assembly by adhesion or melting.

In order to avoid adhesive and melt connections between the sound attenuation assembly and the receiving portion, the sound attenuation assembly may be attached to the fluid conduit, for example, by friction locking or form locking. Alternatively or additionally, a material locking connection between the fluid conduit and the sound attenuation assembly effected by means of a diffusion process is also conceivable. Because no adhesive and melt connections are used in a fluid line assembly according to the invention within the aforementioned scope, the risk is also reduced in comparison with the prior art that foreign matter penetrates into the fluid conduit during attachment of the sound attenuation assembly to the fluid conduit. This also reduces the probability of a malfunction of a functional unit which is provided with fluid supplied through a fluid line assembly according to the invention.

In order to ensure an effective attenuation of sound propagated in the fluid in the fluid line assembly according to the invention, it may be provided in a development of the invention that the sound attenuation assembly comprise a sound attenuation conduit, wherein at least an axial portion of the sound attenuation conduit is enclosed by the fluid conduit, such that at least one resonator cavity is provided radially between the fluid conduit and the sound attenuation conduit. A particularly effective attenuation can be achieved if the entire sound attenuation assembly is enclosed by the fluid conduit, as then at least one resonator cavity can be substantially formed between the sound attenuation conduit and the fluid conduit across the total axial extent of the sound attenuation conduit. The fluid conduit and sound attenuation conduit are preferably coaxial.

An effective sound attenuation can be achieved with a resonator cavity, as a sound wave penetrating said resonator cavity is reflected several times on the inner surfaces thereof, and in each reflection a certain amount of energy is transferred to the resonator walls. In addition, the frequency range to be attenuated can be set through the adjustment of the shape and dimensions of the at least one resonator cavity. A particularly effective sound attenuation can be achieved if the at least one resonator cavity is continuous in the circumferential direction.

In order to attenuate sound in the widest possible frequency range, a plurality of resonator cavities may be provided, which are separated from one another in the axial direction by at least one separating element arranged radially between the fluid conduit and the sound attenuation assembly. In a plurality of resonator cavities, the possibility exists to form these with differing sizes and shapes, so that depending on the size and shape of the resonator cavities, sounds in different frequency ranges can be attenuated. A simple structure of axially adjacent resonator cavities may be ensured by at least one separating element which is circumferentially continuous.

In order to ensure in this configuration that no foreign bodies are introduced into the fluid conduit, it may be provided that at least one separating element is attached free of adhesive and melt connections to the fluid conduit and/or the sound attenuation conduit. Such an attachment may occur via a friction locking and/or force locking connection, wherein the fluid conduit can, for example, be shrunken onto the at least one separating element for the creation of such a connection. If the fluid conduit is not fully cured in the area of application on the at least one separating element, the separating element may penetrate into the fluid conduit and create a form-locking connection with the fluid conduit. If the applied pressure by shrinking is high, this may cause a plastic flow of the materials in the application, which may lead in compatible materials to diffusion processes between these. These diffusion processes may in turn result in a material locking connection between the separating element and fluid conduit.

Particularly reliable friction or form locking connections between the fluid conduit and the sound attenuation assembly may be achieved in that, in the area of application between the at least one separating element and the sound attenuation conduit on the one hand and/or between the at least one separating element and the fluid conduit on the other hand, a high pressure is created through the shrinking of the fluid conduit onto the at least one separating element and/or through the shrinking of the at least one separating element onto the sound attenuation conduit. In order to achieve the highest possible pressure in this area of application, it may be provided that the at least one separating element is radially inwardly or radially outwardly tapered to a radially inner and/or radially outer peripheral edge. If a radially outer peripheral edge of a separating element is radially outwardly tapered and if the fluid conduit is shrunken onto the at least one separating element arranged between the fluid conduit and the sound attenuation assembly, the force exerted by the fluid conduit is hereby concentrated on the radially outwardly tapering peripheral edge with an application surface reduced with respect to an obtuse peripheral edge, which leads there to the exertion of a high pressure on the corresponding separating element. Here too, a tapered peripheral edge of a separating element may penetrate into an application section of the fluid conduit which is not yet fully cured and create a form locking connection. If the materials of the separating element and the fluid conduit are compatible, and if the pressure exerted on the separating element is high enough to cause plastic flow, a material locking connection between the separating element and the fluid conduit may be produced in this way by means of diffusion processes.

The risk that foreign material penetrates into the fluid conduit during assembly of the fluid line assembly may also be reduced in that the at least one separating element is integrally formed with the sound attenuation conduit or the fluid conduit. In a plurality of separating elements, it may also be considered to form at least one separating element integrally with the fluid conduit and at least one separating element integrally with the sound attenuation conduit.

In order to ensure a high degree of transmission of the sound propagated in the sound attenuation conduit to the at least one resonator cavity, it may further be provided that at least one opening leading to at least one resonator cavity is provided in the sound attenuation conduit. A particularly high degree of transmission may be achieved if a plurality of openings leading to at least one resonator cavity are provided, and in the case of a plurality of resonator cavities, if a plurality of openings leading thereto are provided to each resonator cavity.

The construction of the fluid conduit may, for example, be such that the receiving portion as one of the piping components comprises a peripheral wall, which extends more strongly in the axial direction than in the radial direction in a reference longitudinal sectional view containing the longitudinal axis of the fluid conduit, and comprises a shoulder portion provided on at least one axial end portion of the peripheral wall, which extends more strongly in the radial direction than in the axial direction of the reference longitudinal sectional view. In this embodiment, the at least one shoulder portion may be used, for example, for defining a resonator cavity and/or for attaching or positioning the sound attenuation assembly. In order to thereby provide a uniform resonator cavity in the circumferential direction, it is advantageous if the peripheral wall is rotationally symmetrical, in particular cylindrical or conical, and/or if the at least one shoulder portion is rotationally symmetrical, in particular conical or flat. To achieve the highest possible joining forces in the preferred shrinking, the peripheral wall is preferably formed to be materially permeable in the circumferential direction. Although the peripheral wall may be composed of several originally separate axial portions, for the same reason it is also preferably formed to be materially continuous in the axial direction, thus without joining gaps.

In order to gain easy access to a sound attenuation assembly installed in a fluid conduit, for example for maintenance purposes, it may be provided that, on an axial end portion of the peripheral wall, the at least one shoulder portion is nondestructively releasably connected to the peripheral wall as a further piping component. If shoulder portions are provided on both axial end portions of the peripheral wall, it is preferable with regard to simple assembly if a shoulder portion is integrally formed with the peripheral wall on an axial end.

In an alternative embodiment, it may also be provided that the shoulder portions, as a plurality of further piping components on both axial end portions, are nondestructively detachably connected to the peripheral wall. The shoulder portion and the peripheral wall may be nondestructively detachably connected with one another, for example, by screwing, latching or clipping. These types of connections also offer the advantage that while connecting the shoulder portion and the peripheral wall, no foreign material or foreign objects are introduced into the fluid conduit.

As previously noted, a shoulder portion can be used for attaching or positioning the sound attenuation assembly on the fluid conduit. The structure may be such that an axial projection is provided on at least an axial end portion of the peripheral wall on one component of the shoulder portion and sound attenuation assembly, and a recess is provided on the other component of the shoulder portion and sound attenuation assembly, wherein the axial projection and the recess positively engage in the assembled state of the fluid line assembly. The axial projection and the recess may be particularly easily engaged during assembly of the fluid line assembly if the recess is continuous in the circumferential direction. The projection is also preferably continuous in the circumferential direction.

In addition, it may be provided that a connecting fluid conduit is connected to a shoulder portion on a side opposite the receiving portion, whereby a cross-sectional area of the connecting fluid conduit orthogonal to the longitudinal axis is smaller than a cross-sectional area of the receiving portion orthogonal to the longitudinal axis. In this embodiment, the fluid conduit has a smaller cross-sectional area in an axial portion in which no portion of the sound attenuation assembly is included than in the receiving portion, so that less material is required for the production of such a fluid conduit as compared to a fluid conduit which has a cross-sectional area corresponding to the cross-sectional area of the receiving portion across the entire axial extent. If shoulder portions are provided on both axial end portions of the peripheral wall, it is then preferred if a previously-described connecting fluid conduit is connected to each shoulder portion on the side opposite the receiving portion.

If the sound attenuation assembly comprises a sound attenuation conduit, it is then advantageous if the cross-sectional shape and cross-sectional area is adapted to the corresponding cross-sectional shape and cross-sectional area of the connecting fluid conduit, in order to avoid the creation of turbulence in the fluid in the transitional region between the connecting fluid conduit and the sound attenuation conduit, as these may themselves be undesired sources of sound. It may be provided here that the connecting fluid conduit and the sound attenuation conduit have the same cross-sectional shape orthogonal to the longitudinal axis, and that the cross-sectional areas of the connecting fluid conduit and the sound attenuation conduit orthogonal to the longitudinal axis do not differ by more than 10%. The probability that turbulence is created in the transitional region between the connecting fluid conduit and the sound attenuation conduit can be further reduced if the cross-sectional areas of the connecting fluid conduit and the sound attenuation conduit do not differ by more than 5%, or are even identical.

The above-defined technical object is achieved according to a second aspect of the present invention by a method for producing a fluid line assembly according to the invention which comprises the following steps:
a) Providing a fluid conduit, preferably by means of injection molding, having at least two separate piping components to form an axial receiving portion,
b) Providing a sound attenuation assembly,
c) Introducing at least a portion of the sound attenuation assembly into at least one of the at least two piping components,
d) Attaching the sound attenuation assembly to the fluid conduit without adhesive and melt connections and
e) Connecting the at least two piping component to form the axial receiving portion of the fluid conduit.

Even though it is not to be excluded here that the fluid line assembly consists of metal or at least comprises metal, it is preferable for reasons of cost and weight to produce the fluid conduit and/or the sound attenuation assembly at least partially from plastic, preferably by injection molding.

Because no adhesive or melt connections are used in steps d) and e), the risk that foreign material enters the fluid conduit during attachment of the sound attenuation assembly to the fluid conduit or during the formation of the receiving portion is eliminated or at least minimized. The attachment in step d) may comprise, for example, the production of a friction and/or form locking connection between the sound attenuation assembly and the fluid conduit. Alternatively or additionally, the production of a material locking connection brought about, for example, through diffusion between the fluid conduit and the sound attenuation assembly is also conceivable.

In order to achieve the simplest possible introduction of at least one portion of the sound attenuation assembly into at least one piping component of the axial receiving portion of the fluid conduit in step c), it may be provided that, in step c), the temperature of at least one piping component is higher at least in an axial portion than the temperature of the sound attenuation assembly. Here, for example, the sound attenuation assembly can be inserted into a piping component of the receiving portion which has been taken directly from an injection mold and is therefore still warm and widened. Alternatively, for example, starting from a uniform starting temperature of the sound attenuation assembly and the fluid conduit, the sound attenuation assembly may be cooled and/or the at least one piping component may be warmed.

In the latter case, it may be sufficient for easy insertion of the sound attenuation assembly into the at least one piping component if the at least one piping component has a higher temperature on one axial end than on the other axial end in step c). The warmer axial end is preferably that axial end which has an insertion opening for inserting the sound attenuation assembly into the later receiving portion. The warming of an axial portion of the at least one piping component may be achieved, for example, with a radiant heater or a heating sleeve, and leads to a widening of the portion, which facilitates an insertion of the sound attenuation assembly, in particular into a cylindrical piping component. An attachment of the sound attenuation assembly at the receiving portion may be caused exclusively in that step d) comprises a step for equalizing the temperatures of the receiving portion and the sound attenuation assembly. Here, the fluid conduit may be shrunk onto the sound attenuation assembly.

In the embodiment of the receiving portion discussed above, wherein at least one separating element with a radially inwardly and/or outwardly tapering peripheral edge is provided, the above step of shrinking the receiving portion may also provide a particularly good attachment of the at least one separating element through a friction locking or even form locking connection, as due to the tapered form at the radially inner and/or outer peripheral edge, a high pressure can be exerted in the area of application to the fluid conduit and/or the sound attenuation conduit.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
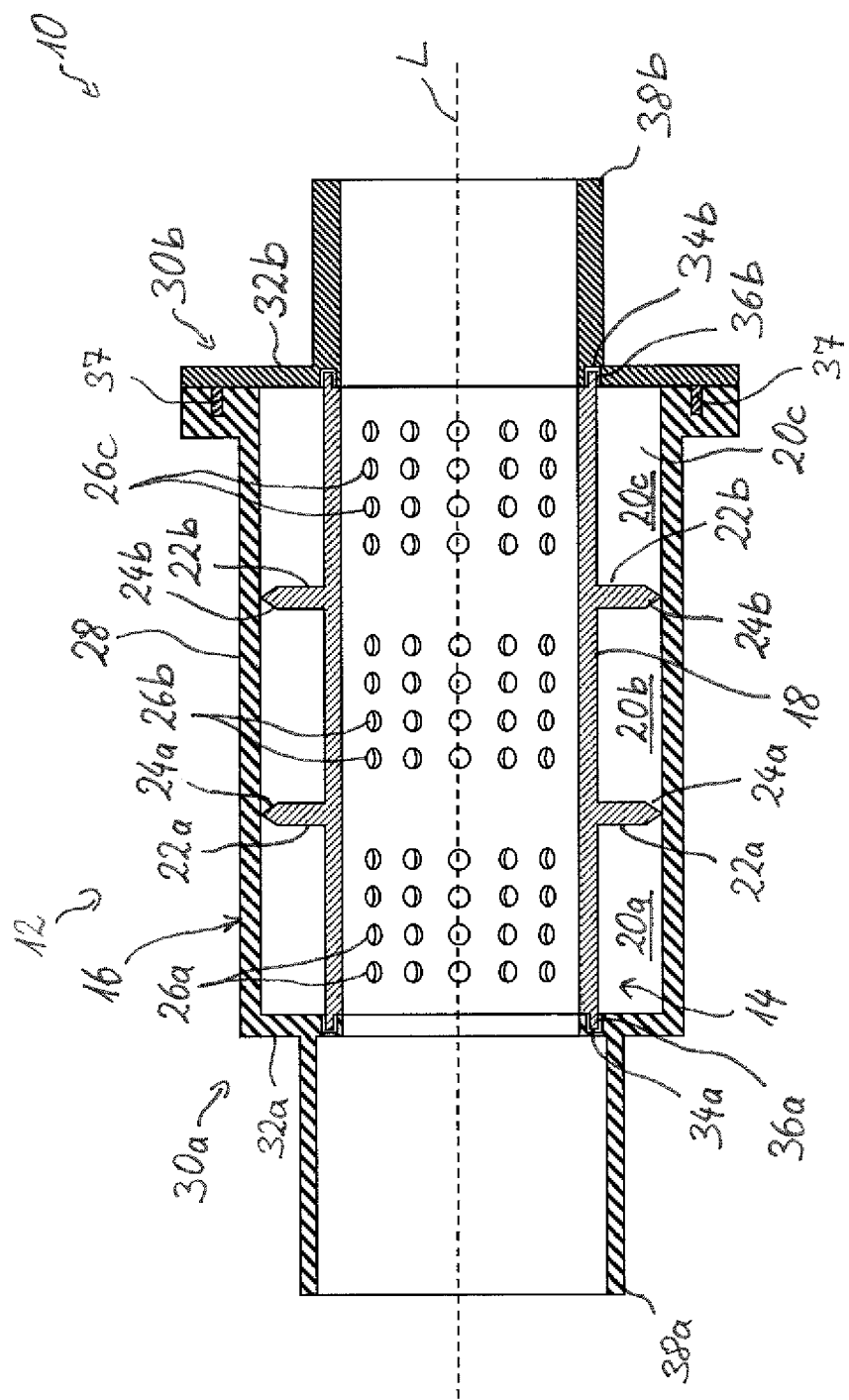
FIG. 1 shows a longitudinal sectional view of a fluid line assembly according to the invention with a fluid conduit and a sound attenuation assembly received in an axial receiving portion of the fluid conduit.

Referring now to the drawing wherein the showings are for the purpose of illustrating preferred and alternative embodiments of the invention only and not for the purpose of limiting the same, FIG. 1 is shown a fluid line assembly generally indicated by the reference character 10. The fluid line assembly 10 comprises a fluid conduit 12, shown individually in FIG. 2, for the passage of a fluid, and a sound attenuation assembly 14, shown individually in FIG. 3, which contributes to the attenuation of sound propagated in the fluid. This fluid may be, for example, charge air to be supplied to an internal combustion engine. The fluid conduit 12 and the sound attenuation assembly 14 extend along a longitudinal axis L which defines an axial direction. The fluid conduit 12 has an axial receiving portion 16, in which the sound attenuation assembly 14 is received.

Figure 3:
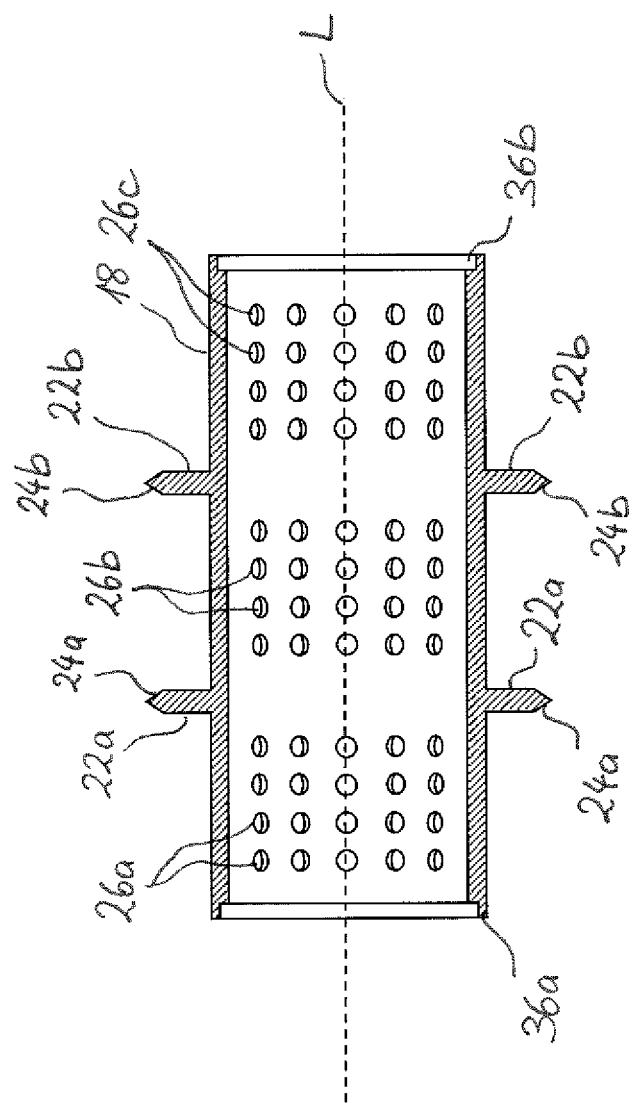
FIG. 3 shows a longitudinal sectional view of the sound attenuation assembly shown in FIG. 1.

As is shown in FIGS. 1 and 3, the sound attenuation assembly 14 may comprise a sound attenuation conduit 18, which may be substantially completely enclosed by the receiving portion 16 of the fluid conduit 12 and may be coaxial thereto. A plurality of circumferentially continuous resonator cavities 20*a*, 20*b*, 20*c* may be provided radially between the fluid conduit 12 and the sound attenuation conduit 18, which resonator cavities may be separated from one another by separating elements 22*a*, 22*b* arranged radially between the fluid conduit 12 and the sound attenuation conduit 18. The separating elements 22*a*, 22*b* may be continuous in the circumferential direction.

An efficient sound attenuation can be achieved with the resonator cavities 20*a*, 20*b*, 20*c*, as a sound wave penetrating thereinto is repeatedly reflected, for example, by the inner surfaces of the resonator cavities 20*a*, 20*b*, 20*c* provided by the fluid conduit 12 or the sound attenuation conduit 18, and with each reflection a certain amount of energy is lost. By setting the shape and dimensions of the resonator cavities 20*a*, 20*b*, 20*c*, it is also possible to adjust the frequency range to be attenuated. To ensure a high degree of transmission of sound propagating in the sound attenuation conduit 18 into the at least one resonator cavity 20*a*, 20*b*, 20*c*, a plurality of openings 26*a*, 26*b*, 26*c* which open into said resonator cavities 20*a*, 20*b*, 20*c* may be provided in the sound attenuation conduit 18 in association with each of the resonator cavities 20*a*, 20*b*, 20*c*. As shown in FIGS. 1 and 3, the separating elements 22*a*, 22*b* may be integral with the sound attenuation conduit 18 and may be tapered radially outward at their respective radially outer peripheral edges 24*a* and 24*b*. Due to this special shape of the separating elements 22*a*, 22*b*, the sound attenuation assembly 14 can be reliably attached to the fluid conduit 12 without adhesive and melt connections.

Mounting of the sound attenuation assembly 10 may initially start from a uniform initial temperature of the fluid conduit 12 and the sound attenuation assembly 14, an axial end of the receiving portion 16 having an insertion opening for inserting the sound attenuation assembly 14 into the fluid conduit 12 may be heated with respect to the sound attenuation assembly 14 and thus widened, in order to enable an easy insertion. Alternatively or additionally, it is also possible to cool and thus shrink an axial end of the sound attenuation assembly 14 which is to first be inserted into the axial receiving portion 16. If, for example, the fluid conduit 12 is produced by injection molding, assemblage may be carried out immediately after removal from the mold, i.e. at a time at which the fluid conduit 12 is still warm and therefore widened with respect to the sound attenuation assembly 14.

After insertion of the sound attenuation assembly 14 into the fluid conduit 12, a step for equalizing the temperatures of the sound attenuation assembly 14 and the receiving portion 16 of the fluid conduit 12 takes place. In this step, for example, the fluid conduit 12 and the sound attenuation assembly 14 can be returned to the aforementioned initial temperature. If in the previous step the temperature of the fluid conduit 12 was increased relative to the initial temperature, the fluid conduit 12 is thus cooled in this temperature equalizing step and thereby shrunk onto the radially outwardly tapering peripheral edges 24*a*, 24*b* of the separating elements 22*a*, 22*b*. Due to the tapered form of the peripheral edges 24*a*, 24*b* and an application surface which is consequently reduced with respect to an obtuse peripheral edge, very high pressure is exerted thereupon by the receiving portion 16 of the fluid conduit 12, which provides a reliable friction locking connection between the separating elements 22*a*, 22*b* and the fluid conduit 12. Alternatively or additionally, complementary form locking counter geometries, for example in the form of circumferentially extending grooves, may be provided at the positions on the separating elements 22*a*, 22*b* on the receiving portion 16 of the fluid conduit 12 which correspond to the peripheral edges 24*a*, 24*b*, so that, in addition to a friction locking connection, a form locking connection between the sound attenuation assembly 14 and the receiving portion 16 of the fluid conduit 12 may be created. A form locking connection between the separating elements 22*a*, 22*b* may also be achieved of the receiving portion 16 of the fluid conduit 12 is not yet fully cured, and the tapered peripheral edges 24*a*, 24*b* may therefore penetrate into the fluid conduit 12. Moreover, it is also conceivable that in the case of a very high pressure in the area of application between the separating elements 22*a*, 22*b* and the fluid conduit 12, a plastic flow arises, and as a result thereof in the case of compatible materials diffusion processes arise in the contacting components, which may lead to a material locking connection between the separating elements 22*a*, 22*b* and the fluid conduit 12.

Figure 2:
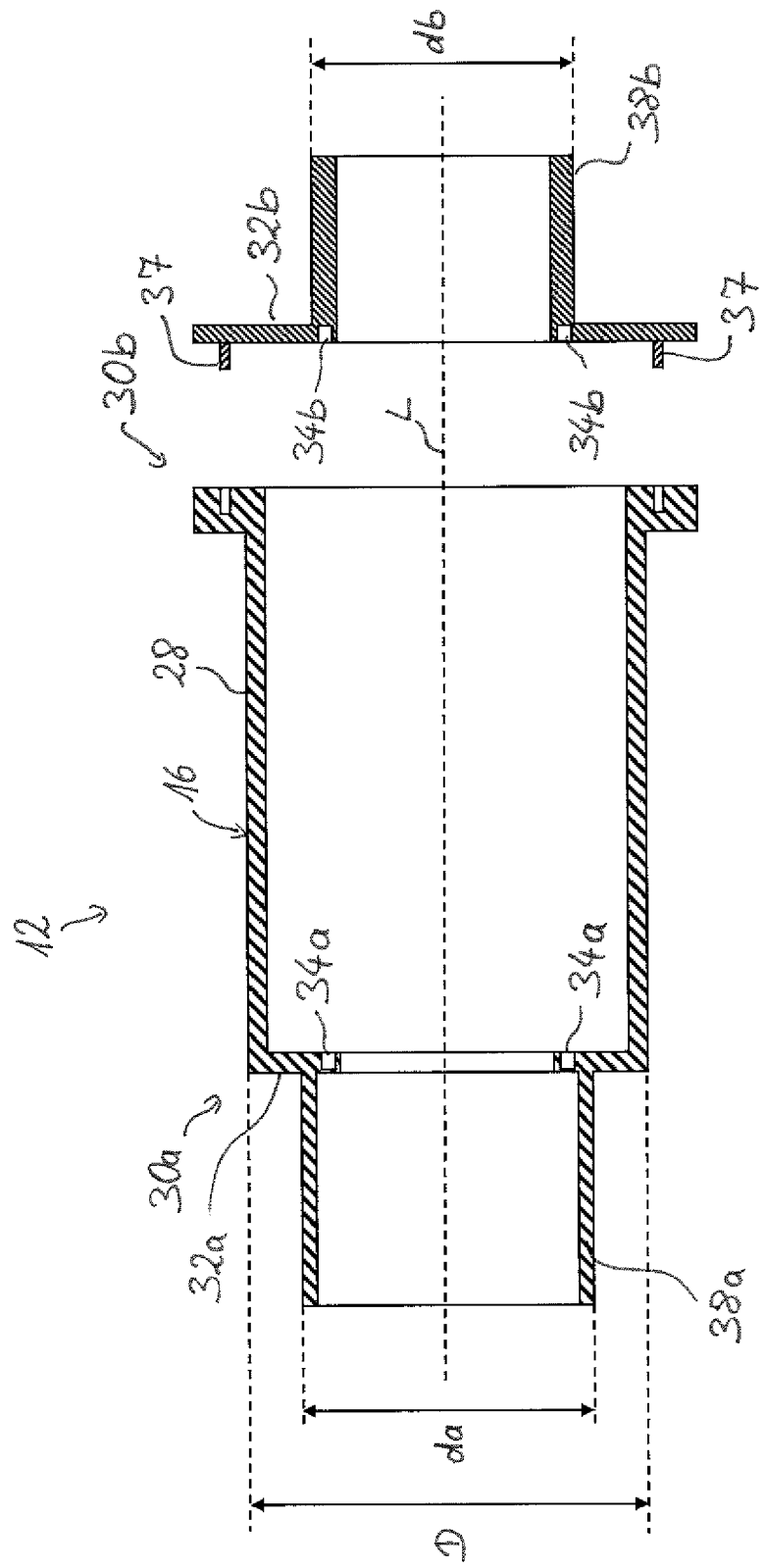
FIG. 2 shows a longitudinal sectional view of the fluid conduit shown in FIG. 1.

As shown in FIGS. 1 and 2, the receiving portion 16 of the fluid conduit 12 may comprise a peripheral wall 28 as a piping component and may comprise a respective shoulder portion 32*a*, 32*b* at both axial ends 30*a*, 30*b* of the peripheral wall 28, of which shoulder portions 32*a*, 32*b*, the shoulder portion 32*b* in particular forms a further piping component of the receiving portion 16. In the reference longitudinal sectional views of FIGS. 1 and 2 containing the longitudinal axis L, the peripheral wall 28 may, as shown here, extend more strongly in the axial direction than in the radial direction and may, as shown here, be rotationally symmetrical, in particular cylindrical. As also shown here, the shoulder portions 32*a*, 32*b* may extend in the reference longitudinal sectional view more strongly in the radial than in the axial direction and may also be rotationally symmetrical, flat and continuous in the circumferential direction.

To achieve the highest possible joining forces in the preferred shrinking, the peripheral wall 28 is preferably formed to be materially permeable in the circumferential direction. For the same reason, it is preferable if, as indicated in FIGS. 1 and 2, it is also materially continuous in the axial direction, thus in particular without joining gaps.

As shown in FIG. 1, the shoulder portions 32*a*, 32*b* may serve as axial limitations for the resonator cavities 20*a*, 20*c* and may also be used for positioning the sound attenuation assembly 14 in the radial direction. For this purpose, it may be provided that a recess 34*a*, 34*b* is provided on each of the shoulder portions 32*a*, 32*b*, and that a respective projection 36*a*, 36*b* is provided at each axial end of the sound attenuation conduit 18, wherein the recesses 34*a*, 34*b* and the projections 36*a*, 36*b* have mutually complimentary forms and may positively engage in the assembled state of the fluid line assembly 10. The recesses 34*a*, 34*b* are preferably continuous in the circumferential direction. The axial projections 36*a*, 36*b* are particularly preferably continuous in the circumferential direction.

Alternatively, of course, the recesses 34*a*, 34*b* may be provided at the axial ends of the sound attenuation conduit 18 and the axial projections 36*a*, 36*b* may be provided on the shoulder portions 32*a*, 32*b*.

In order to gain easy access to a sound attenuation assembly 14 installed in a fluid conduit 12, for example for installation and maintenance purposes, a shoulder portion 32b may be nondestructively releasably connected to the peripheral wall 28, for example by screwing, latching or clipping. Corresponding connecting members are provided in FIGS. 1 and 2 with the reference character 37. In the embodiment shown in the figures, only one shoulder portion 32b is nondestructively releasably connectable with the peripheral wall 28, while the other shoulder portion 32a is integrally formed with the peripheral wall 28. In principle, however, it should not be excluded that both shoulder portions 32a, 32b may be nondestructively releasably connectable with the peripheral wall 28 as piping components of the receiving portion 16 of the fluid conduit 12.

In addition, as also shown in FIGS. 1 and 2, connecting fluid conduits 38a, 38b may be provided on the shoulder portions 32a, 32b on the side facing away from the receiving portion 16. As shown here, these may be integrally formed with the shoulder portions 32a, 32b.

The connecting fluid conduits 38a, 38b may each have a cross-sectional area which is orthogonal to the longitudinal axis L, which cross-sectional area is smaller than a cross-sectional area of the receiving portion 16 which is orthogonal to the longitudinal axis L. In this embodiment, material can be saved as compared to a fluid conduit having a uniform cross-sectional area in the axial direction, as the fluid conduit 12 is formed here with a greater cross-sectional area only in the axial receiving portion 16, in which the sound attenuation assembly 14 is received. The connecting fluid conduits 38a, 38b may also be rotationally symmetrical with respect to the longitudinal axis L, and in particular may be cylindrical, as shown in FIGS. 1 and 2. Because in this embodiment the peripheral wall 28 of the receiving portion 16 is substantially cylindrical, the size difference of the cross-sectional area of the receiving portion 16 orthogonal to the longitudinal axis L and the cross-sectional area of the connecting fluid conduits 38a, 38b orthogonal to the longitudinal axis L can be seen at the different diameters D, da, db of the receiving portion 16 and the connecting fluid conduits 38a, 38b (FIG. 2).

Because turbulence in the fluid caused, for example, by the geometry of the fluid line assembly 10, can itself generate sound, it is advantageous if the different components have a shape which ensures as laminar a flow as possible. In particular to avoid the creation of turbulence in the fluid in a transitional region between the sound attenuation conduit 18 and the connecting fluid conduits 38a, 38b, the sound attenuation conduit 18 and the connecting fluid conduits 38a, 38b may have an identical cross-sectional shape orthogonal to the longitudinal axis L, and it may be provided that their cross-sectional areas orthogonal to the longitudinal axis L differ by no more than 10%. Preferably, their cross-sectional areas differ by no more than 5%, or are most preferably equal. In the embodiment illustrated in the figures, the sound attenuation conduit 18 and the connecting fluid conduit 38b have a substantially equal inner cross-sectional area (FIG. 1).

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A fluid line assembly, such as for charge air to be supplied to an internal combustion engine, the fluid line assembly comprising a fluid conduit, extending along a longitudinal axis which defines an axial direction, for the passage of a fluid and comprising a sound attenuation assembly received in an axial receiving portion of the fluid conduit which includes at least two piping components, the sound attenuation assembly at least contributing to an attenuation of sound propagated in the fluid, the connection of the at least two piping components of the axial receiving portion with one another, as well as the connection of the sound attenuation assembly with the axial receiving portion of the fluid conduit, being free of adhesive and melt connections, wherein the at least two piping components includes a peripheral wall and a shoulder portion, the peripheral wall extending more strongly in the axial than the radial direction in a reference longitudinal sectional view of the fluid conduit containing the longitudinal axis, the shoulder portion provided on at least one axial end portion of the peripheral wall, which shoulder portion extends more strongly in the radial direction than in the axial direction in the reference longitudinal sectional view; the fluid line assembly further including an axial projection on at least an axial end portion of the peripheral wall on one component of the shoulder portion and the sound attenuation assembly, and a recess on the other component of the shoulder portion and the sound attenuation assembly, wherein the axial projection and the recess positively engage in an assembled state of the fluid line assembly.

2. The fluid line assembly according to claim 1, wherein the sound attenuation assembly comprises a sound attenuation conduit, wherein at least an axial portion of the sound attenuation conduit is enclosed by the fluid conduit, such that at least one resonator cavity is provided radially between the fluid conduit and the sound attenuation conduit.

3. The fluid line assembly according to claim 2, further including a plurality of resonator cavities, the plurality of resonator cavities being separated from one another in the axial direction by at least one separating element, the at least one separating element being arranged radially between the fluid conduit and the sound attenuation assembly, the at least one separating element having a first radial end attached to one of the fluid conduit and the sound attenuation conduit and a second radial end engaging the other of the fluid conduit and the sound attenuation conduit; the second end having at least one of a friction and a form locking connection with the other of the fluid conduit and the sound attenuation conduit such that the second end is fixed relative to the other of the fluid conduit and the sound attenuation conduit and is free of adhesive and melt connections.

4. The fluid line assembly according to claim 3, wherein the at least one separating element is at least one of radially inwardly and radially outwardly tapered to at least one of a radially inner peripheral edge and a radially outer peripheral edge.

5. The fluid line assembly according to claim 3, wherein the first radial end of the at least one separating element is integrally formed with the one of the fluid conduit and the sound attenuation conduit.

6. The fluid line assembly according to claim 2, further including at least one opening in the sound attenuation conduit, the at least one opening leading to the at least one resonator cavity.

7. The fluid line assembly according to claim 6, wherein the at least one opening in the sound attenuation conduit is a plurality of openings leading to the at least one resonator cavity.

8. The fluid line assembly according to claim 2 wherein the entire sound attenuation conduit is enclosed by the fluid conduit.

9. The fluid line assembly according to claim 3, wherein the at least one separating element is continuous in the circumferential direction.

10. The fluid line assembly according to claim 1, wherein at least one of the peripheral wall is rotationally symmetrical and the at least one shoulder portion is rotationally symmetrical.

11. The fluid line assembly according to claim 1, wherein on at least one axial end portion of the peripheral wall, the shoulder portion is nondestructively releasably connected with the peripheral wall.

12. The fluid line assembly according to claim 1, wherein a connecting fluid conduit is connected to at least one shoulder portion on a side opposite the receiving portion, whereby a cross-sectional area of the connecting fluid conduit orthogonal to the longitudinal axis is smaller than a cross-sectional area of the receiving portion orthogonal to the longitudinal axis.

13. The fluid line assembly according to claim 12, wherein the connecting fluid conduit and the sound attenuation conduit have generally the same cross-sectional shape orthogonal to the longitudinal axis, and that the cross-sectional areas of the connecting fluid conduit and the sound attenuation conduit orthogonal to the longitudinal axis do not differ by more than 10%.

14. The fluid line assembly according to claim 12, wherein the connecting fluid conduit and the sound attenuation conduit have generally the same cross-sectional shape orthogonal to the longitudinal axis, and connecting fluid conduit and the sound attenuation conduit have generally the same cross-sectional areas orthogonal to the longitudinal axis.

15. The fluid line assembly according to claim 13, wherein the cross-sectional areas of the connecting fluid conduit and the sound attenuation conduit orthogonal to the longitudinal axis do not differ by more than 5%.

16. The fluid line assembly according to claim 13, wherein the cross-sectional areas of the connecting fluid conduit and the sound attenuation conduit orthogonal to the longitudinal axis are generally equal.

17. A method for producing a fluid line assembly, the method comprising the steps of:
a) Providing a fluid conduit having at least two piping components to form an axial receiving portion,
b) Providing a sound attenuation assembly,
c) Introducing at least a portion of the sound attenuation assembly into at least one piping component of the axial receiving portion of the fluid conduit,
d) Attaching the sound attenuation assembly to at least one piping component of the receiving portion of the fluid conduit without adhesive and melt connections wherein the attaching comprises a production of at least a form locking connection between the fluid conduit and the sound attenuation assembly, brought about between a shoulder portion of the receiving portion of the fluid conduit and the sound attenuation assembly.

18. The method for producing a fluid line assembly according to claim 17, wherein the at least two piping components includes a peripheral wall and a shoulder portion, the peripheral wall extending more strongly in the axial direction than the radial direction in a reference longitudinal sectional view of the fluid conduit containing the longitudinal axis, the shoulder portion provided on at least one axial end portion of the peripheral wall, which shoulder portion extends more strongly in the radial direction than in the axial direction in the reference longitudinal sectional view, the peripheral wall having an inner application surface, the sound attenuation assembly having a sound attenuation conduit and at least one separating element, the sound attenuation assembly being tubular and extending along a linear axis, the at least one separating element being arranged radially outwardly from the sound attenuation conduit, the at least one separating element has a first end attached to one of the fluid conduit and the sound attenuation conduit and a second end engaging the other of the fluid conduit and the sound attenuation conduit; wherein step d) further includes the second end having at least one of a friction and a form locking connection with the other of the fluid conduit and the sound attenuation conduit such that the second end is fixed relative to the other of the fluid conduit and the sound attenuation conduit and is free of adhesive and melt connections.

19. The method according to claim 17, wherein step d) further comprises the production of at least one of a friction locking connection, a form locking connection and a material locking connection, between the fluid conduit and the sound attenuation assembly, brought about through a diffusion process between the at least one piping component of the receiving portion of the fluid conduit and the sound attenuation assembly.

20. The method according to claim 17, further including the step of providing heat before the introducing step wherein the temperature of the at least one piping component of the axial receiving portion of the fluid conduit is raised before the introducing step such that the temperature of the at least one piping component of the axial receiving portion of the fluid conduit is higher at least in an axial portion than the temperature of the sound attenuation assembly during the introducing step.

21. The method according to claim 20, wherein the receiving portion in the introducing step has a higher temperature on one axial end than on the other axial end.

22. The method according to claim 20, further including the step of equalizing the temperatures of the axial receiving portion of the fluid conduit and the sound attenuation assembly at least one of during and after the attaching step wherein the fluid conduit is preferably shrunk onto the sound attenuation assembly.

23. A fluid line assembly, such as for charge air to be supplied to an internal combustion engine, the fluid line assembly comprising a fluid conduit, extending along a longitudinal axis which defines an axial direction, for the passage of a fluid and comprising a sound attenuation assembly received in an axial receiving portion of the fluid conduit which includes at least two piping components, the sound attenuation assembly at least contributing to an attenuation of sound propagated in the fluid, the connection of the at least two piping components of the axial receiving portion with one another, as well as the connection of the sound attenuation assembly with the axial receiving portion of the fluid conduit, being free of adhesive and melt connections, wherein the axial receiving portion comprises a peripheral wall, which extends more strongly in the axial direction than the radial direction in a reference longitudinal sectional view of the fluid conduit containing the longitudinal axis, and comprises a shoulder portion provided on at least one axial end portion of the peripheral wall, which shoulder portion extends more strongly in the radial direction than in the axial direction in the reference longitudinal sectional view, the sound attenuation assembly comprises a sound attenuation conduit, wherein at least an axial portion of the sound attenuation conduit is enclosed by the fluid conduit, the fluid line assembly further comprising at least two axially spaced resonator cavities between the fluid conduit and the sound attenuation conduit and comprising a separating element separating the at least two axially spaced resonator cavities in the axial direction, the separating element being arranged radially between the fluid conduit and the sound attenuation assembly, the separating element having a first radial end attached to one of the fluid conduit and the sound attenuation conduit and a second radial end engaging the other of the fluid conduit and the sound attenuation conduit; the second end having at least one of a friction and a form locking connection with the other of the fluid conduit and the sound attenuation conduit such that the second end is fixed relative to the other of the fluid conduit and the sound attenuation conduit and is free of adhesive and melt connections.

24. A method for producing a fluid line assembly, the method comprising the steps of:
 a) Providing a fluid conduit having at least two separate piping components to form an axial receiving portion, the at least two piping components includes a peripheral wall and a shoulder portion, the peripheral wall extending more strongly in the axial direction than the radial direction in a reference longitudinal sectional view of the fluid conduit containing the longitudinal axis, the shoulder portion provided on at least one axial end portion of the peripheral wall, which shoulder portion extends more strongly in the radial direction than in the axial direction in the reference longitudinal sectional view, the peripheral wall having an inner application surface,
 b) Providing a sound attenuation assembly, the sound attenuation assembly having a sound attenuation conduit and at least one separating element, the sound attenuation conduit being tubular and extending along a linear axis, the at least one separating element extending radially outwardly from the sound attenuation conduit and the linear axis, the at least one separating element having an outer peripheral edge,
 c) Introducing at least a portion of the sound attenuation assembly into the axial receiving portion of the fluid conduit such that the outer peripheral edge of the at least one separating element faces the inner application surface,
 d) Attaching the sound attenuation assembly to at least the peripheral wall of the receiving portion of the fluid conduit without adhesive and melt connections by a frictional engagement between the outer peripheral edge and the inner application surface of the axial receiving portion.

\* \* \* \* \*